United States Patent
Lee et al.

(10) Patent No.: US 12,541,598 B2
(45) Date of Patent: Feb. 3, 2026

(54) STORAGE DEVICE AND METHOD OF PROVIDING FIRMWARE IMAGE

(71) Applicant: Samsung Electronics Co., Ltd., Suwon-si (KR)

(72) Inventors: Yongjae Lee, Suwon-si (KR); Kyungwoo Noh, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 25 days.

(21) Appl. No.: 18/632,803

(22) Filed: Apr. 11, 2024

(65) Prior Publication Data

US 2025/0028834 A1 Jan. 23, 2025

(30) Foreign Application Priority Data

Jul. 20, 2023 (KR) .................. 10-2023-0094464

(51) Int. Cl.
*G06F 15/177* (2006.01)
*G06F 21/57* (2013.01)
(Continued)

(52) U.S. Cl.
CPC .......... *G06F 21/572* (2013.01); *G06F 21/575* (2013.01); *H04L 9/0894* (2013.01);
(Continued)

(58) Field of Classification Search
CPC ................. G06F 21/572; G06F 21/575; G06F 2221/033; G06F 21/79; G06F 21/602;
(Continued)

(56) References Cited

U.S. PATENT DOCUMENTS

| 7,929,692 B2 | 4/2011 | Kim et al. |
| 9,558,354 B2 | 1/2017 | Martinez |

(Continued)

FOREIGN PATENT DOCUMENTS

KR 2024-0064493 A 5/2024

OTHER PUBLICATIONS

Elaine Barker "Recommendation for Key Management: Part 1—General", NIST Special Publication 800-57 Part 1 Revision 5 pp. 38-47, 5.3.6 Cryptoperiod Recommendations for Specific Key Types.
(Continued)

*Primary Examiner* — Volvick Derose
(74) *Attorney, Agent, or Firm* — Harness, Dickey & Pierce, P.L.C.

(57) ABSTRACT

A storage device includes: a non-volatile memory for storing a firmware set including a firmware image encrypted using a symmetric key and an encrypted symmetric key generated by encrypting the symmetric key using a public key; and a storage controller for controlling the non-volatile memory, wherein the storage controller includes: a physically unclonable function (PUF) chip having a unique security key; and a one-time programmable (OTP) memory for storing an encrypted secret key generated by encrypting a secret key paired with the public key using the PUF chip, wherein a firmware image is obtained by loading the firmware set, providing the encrypted secret key to the PUF chip, receiving the secret key from the PUF chip, generating the symmetric key by decrypting the encrypted symmetric key using the secret key, and decrypting the encrypted firmware image using the symmetric key.

20 Claims, 11 Drawing Sheets

(51) Int. Cl.
   *H04L 9/08* (2006.01)
   *H04L 9/30* (2006.01)
   *H04L 9/32* (2006.01)
   *G06F 9/4401* (2018.01)

(52) U.S. Cl.
   CPC .......... *H04L 9/3073* (2013.01); *H04L 9/3278* (2013.01); *G06F 9/4401* (2013.01); *G06F 2221/033* (2013.01)

(58) Field of Classification Search
   CPC ..... G06F 21/73; H04L 9/0894; H04L 9/3073; H04L 9/3278; H04L 9/0866; H04L 9/0891; H04L 9/06; H04L 9/0861; H04L 9/3228
   USPC .......................................................... 713/2
   See application file for complete search history.

(56) References Cited

U.S. PATENT DOCUMENTS

| | | |
|---|---|---|
| 9,792,439 B2 | 10/2017 | Colnot |
| 10,146,942 B2 | 12/2018 | Martinez et al. |
| 11,307,777 B2 | 4/2022 | Park et al. |
| 11,455,379 B2 | 9/2022 | Lai et al. |
| 11,783,041 B2 * | 10/2023 | Park ........................ G06F 21/31 713/2 |
| 12,255,994 B2 * | 3/2025 | Liu ........................ H04L 9/0861 |
| 12,375,329 B2 * | 7/2025 | Cai ................... H04L 12/40136 |
| 2005/0154912 A1 * | 7/2005 | Kim ........................ G06F 21/72 726/26 |
| 2014/0082373 A1 * | 3/2014 | Colnot .................. G06F 21/575 713/193 |
| 2016/0147996 A1 * | 5/2016 | Martinez ............... H04L 9/0877 713/171 |
| 2018/0183590 A1 * | 6/2018 | Kuo ..................... H04L 9/0838 |
| 2020/0287716 A1 * | 9/2020 | Zitlaw ...................... H04L 9/14 |
| 2021/0012008 A1 * | 1/2021 | Kim ..................... H04L 9/0891 |
| 2021/0200874 A1 * | 7/2021 | Markey ................ H04L 9/0643 |
| 2021/0211281 A1 * | 7/2021 | Park ....................... G06F 21/74 |
| 2021/0312057 A1 * | 10/2021 | Kloth .................... G06F 21/575 |
| 2021/0319139 A1 * | 10/2021 | Ruan .................... G06F 21/602 |
| 2022/0405392 A1 * | 12/2022 | Nix ...................... H04L 9/3249 |
| 2023/0090664 A1 * | 3/2023 | Mondello ............. G06F 21/602 726/30 |
| 2023/0273977 A1 * | 8/2023 | Marando ................. G06F 21/10 726/26 |
| 2024/0152284 A1 | 5/2024 | Lee et al. |
| 2024/0187262 A1 * | 6/2024 | Armour ................ H04L 9/3073 |
| 2024/0267211 A1 * | 8/2024 | Shingala ................ G06F 21/72 |
| 2025/0028834 A1 * | 1/2025 | Lee ....................... H04L 9/0891 |

OTHER PUBLICATIONS

Tatu Ylonen, et al. "Security of Interactive and Automated Access Management Using Secure Shell (SSH)", NISTIR 7966 p. 42.

\* cited by examiner

STORAGE DEVICE AND METHOD OF PROVIDING FIRMWARE IMAGE

CROSS-REFERENCE TO RELATED APPLICATION

This application claims benefit of priority under 35 U.S.C. § 119 to Korean Patent Application No. 10-2023-0094464 filed on Jul. 20, 2023, in the Korean Intellectual Property Office, the disclosure of which is incorporated herein by reference in its entirety.

BACKGROUND

The present inventive concepts relate to storage devices and methods of providing firmware images to the storage devices.

Firmware may refer to a program for controlling hardware. The firmware may be injected into a storage space in the hardware when the hardware is manufactured. Attacks on systems including firmware and hardware may be attempted in various manners. Attackers may attempt to modify the firmware of a system, thus allowing the system to perform an operation which the attackers intend.

In order to provide security against attacks that deform firmware, an encrypted firmware image may be injected into the hardware, and the hardware may decrypt and use the encrypted firmware image. Meanwhile, the firmware image may be encrypted using a symmetric key so that the encrypted firmware image may be quickly decrypted.

SUMMARY

Aspects of the present inventive concepts provide methods of transmitting a symmetric key for decrypting an encrypted firmware image in a storage device without leaking the symmetric key to the outside.

According to some example embodiments, a storage device includes: a non-volatile memory configured to store a firmware set including a firmware image encrypted using a symmetric key and an encrypted symmetric key generated by encrypting the symmetric key using a public key; and a storage controller configured to control the non-volatile memory, wherein the storage controller includes a physically unclonable function (PUF) chip having a unique security key; and a one-time programmable (OTP) memory configured to store an encrypted secret key generated by encrypting a secret key paired with the public key using the PUF chip, and wherein the storage controller is configured to obtain the firmware image by loading the firmware set, providing the encrypted secret key to the PUF chip, receiving the secret key from the PUF chip, generating the symmetric key by decrypting the encrypted symmetric key using the secret key and decrypting the encrypted firmware image using the symmetric key.

According to some example embodiments, a booting method of a storage device includes: loading a firmware set stored in a non-volatile memory device into a buffer memory; generating a customer secret key by decrypting an encrypted customer secret key stored in a one-time programmable (OTP) memory using a physically unclonable function (PUF) chip; generating a customer symmetric key by decrypting an encrypted customer symmetric key included in the firmware set using the customer secret key; generating an encrypted firmware image by decrypting a double-encrypted firmware image included in the firmware set using the customer symmetric key; generating a vendor secret key by decrypting an encrypted vendor secret key stored in the OTP memory using the PUF chip; generating a vendor symmetric key by decrypting an encrypted vendor symmetric key included in the firmware set using the vendor secret key; generating a firmware image by decrypting the encrypted firmware image using the vendor symmetric key; and executing firmware using the generated firmware image.

According to some example embodiments, a method of providing a firmware image includes: generating a vendor symmetric key, and a first key pair including a vendor public key and a vendor secret key; providing a first key injection command including the vendor secret key and an authenticator to a storage device, controlling the storage device to verify the first key injection command and encrypt and store the vendor secret key with a unique security key; generating an encrypted firmware image by encrypting the firmware image using the vendor symmetric key, and generating an encrypted vendor symmetric key by encrypting the vendor symmetric key using the vendor public key; generating a customer symmetric key, and a second key pair including a customer public key and a customer secret key; providing a second key injection command including the customer secret key and the authenticator to the storage device, controlling the storage device to verify the second key injection command and encrypt and store the customer secret key with the unique security key; generating a double-encrypted firmware image by encrypting the encrypted firmware image using the customer symmetric key, and generating an encrypted customer symmetric key by encrypting the customer symmetric key using the customer public key; and providing a firmware set including the double-encrypted firmware image, the encrypted vendor symmetric key and the encrypted customer symmetric key, to the storage device.

In a method of providing a firmware image according to some example embodiments of the present inventive concepts, a symmetrical key for decrypting an encrypted firmware image may be encrypted with a public key and transmitted to a storage device, along with the encrypted firmware image. Accordingly, security for the symmetric key may be enhanced, and the symmetric key for encrypting the firmware image may be easily changed. Furthermore, according to some example embodiments, a host may encrypt firmware without the intervention of a firmware vendor and transmit a symmetrical key for decrypting the encrypted firmware to the storage device.

A storage device according to some example embodiments may encrypt a secret key capable of decrypting the encrypted symmetric key with a unique security key of the storage device and store the same in an internal storage space, thereby further enhancing security for the symmetric key.

The aspects to be solved by the present inventive concepts are not limited to the above-mentioned example embodiments, and other example embodiments not mentioned herein will be clearly understood by those skilled in the art from the following description.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Figure 1:
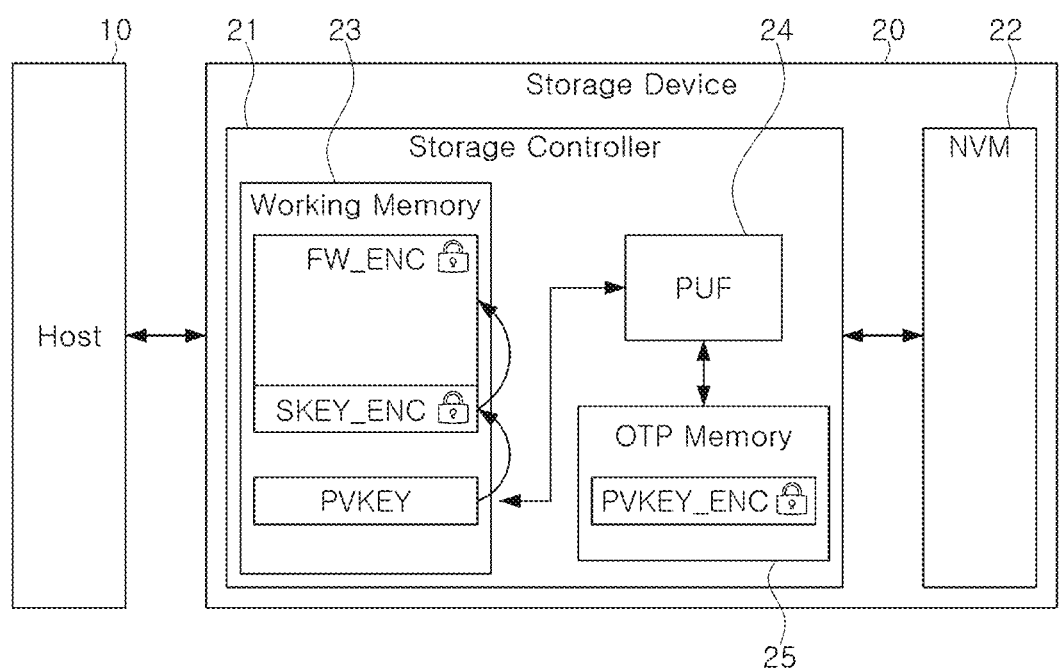
FIG. 1 is a view illustrating a storage system according to some example embodiments.

Hereinafter, some example embodiments of the present inventive concepts will be described more fully with reference to the accompanying drawings, in which some example embodiments are shown. As those skilled in the art would realize, the described example embodiments may be modified in various different ways, all without departing from the spirit or scope of the present inventive concepts.

Accordingly, the drawings and description are to be regarded as illustrative in nature and not restrictive. Like reference numerals designate like elements throughout the specification. The sequence of operations or steps are not limited to the order presented in the claims or figures unless specifically indicated otherwise. The order of operations or steps may be changed, several operations or steps may be merged, some operations or steps may be divided, and specific operations or steps may not be performed.

As used herein, expressions written in the singular may be construed in the singular or plural unless an explicit expression such as "one" or "single" is used. The singular forms "a" and "an" are intended to include the plural forms as well, unless the context clearly indicates otherwise. Although the terms including ordinal numbers such as first, second, and the like may be used herein to describe various elements, components, steps and/or operations, these terms are only used to distinguish one element, component, step or operation from another element component, step, or operation.

FIG. 1 is a view illustrating a storage system according to some example embodiments.

A storage system 1 may include a host 10 and a storage device 20. The storage device 20 may include a storage controller 21 and a non-volatile memory device 22.

The host 10 may include at least one core processing commands. For example, the host 10 includes an application processor, a microprocessor, a central processing unit (CPU), a processor core, a multicore processor, a multiprocessor, an application-specific integrated circuit (ASIC), and a field programmable gate array (FPGA), but example embodiments are not limited thereto.

The storage device 20 may include a storage medium for storing data in response to a request from the host 10. For example, the storage device 20 may include at least one of a solid state drive (SSD), an embedded memory, and a removable external memory, but example embodiments are not limited thereto. In some example embodiments, when the storage device 20 is an SSD, an embedded memory, or an external memory, the storage device 20 may further include a non-volatile memory device 22.

In some example embodiments, when the storage device 20 is the SSD, the storage device 20 may be a device complying with a non-volatile memory express (NVMe) standard. In some example embodiments, when the storage device 20 is the embedded memory or the external memory, the storage device 20 may be a device complying with the universal flash storage (UFS) or embedded multimedia card (eMMC) standard. In some example embodiments, each of the host 10 and the storage device 20 may generate and transmit packets according to adopted standard protocols.

The storage device 20 may include a storage controller 21 and a non-volatile memory device 22. The storage controller 21 may control an overall operation of the storage device 20. For example, the storage controller 21 may store data in the non-volatile memory device 22 in response to the request from the host 10, and provide the data stored in the non-volatile memory device 22 to the host 10 in response to the request from the host 10.

In some example embodiments, when the non-volatile memory device 22 includes a flash memory, the flash memory may include a 2D NAND memory array or a 3D (or vertical) NAND (VNAND) memory array. In some example embodiments, the storage device 20 may include various other types of non-volatile memories. For example, a magnetic RAM (MRAM), a spin-transfer torque MRAM, a conductive bridging RAM (CBRAM), a ferroelectric RAM (FeRAM), a phase RAM (PRAM), and a resistive memory (resistive RAM) and various other types of memory may be applied to the storage device 20, but example embodiments are not limited thereto.

The storage controller 21 may execute firmware. The firmware may refer to software for controlling the storage device 20. For example, the firmware of the storage device 20 may include a host interface layer (HIL), a flash translation layer (FTL), and a flash interface layer (FIL). The HIL may manage data transmission between the host 10 and the storage controller 21, the FTL may convert a logical address received from the host 10 to a physical address of the non-volatile memory device 22, and the FIL may manage data transmission between the storage controller 21 and the non-volatile memory device 22.

According to some example embodiments, to provide security against attacks that modify firmware, a firmware vendor may encrypt the firmware image and distribute the firmware image as an encrypted firmware image FW_ENC. For example, the firmware vendor may be a manufacturer of the storage device 20, a manufacturer of the storage system 1, or a supplier of the firmware. The firmware vendor may encrypt the firmware image with a symmetric key so that the firmware image including a large amount of data may be quickly decrypted in the storage controller 21.

In some example embodiments, to update the firmware, the host 10 may obtain an encrypted firmware image FW_ENC from the firmware vendor and may transmit the encrypted firmware image FW_ENC to the storage device 20. For example, the host 10 may be a customer who receives the storage device 20 from the manufacturer of the storage device 20 and uses the storage device 20 directly or sells the storage device 20 to a third party, but example embodiments are not limited thereto.

The storage controller 21 may decrypt the encrypted firmware image FW_ENC obtained from the host 10 and may execute the firmware using the decrypted firmware image. The storage controller 21 may decrypt the encrypted firmware image FW_ENC using the same symmetric key as a symmetric key used to encrypt the firmware image.

In some example embodiments, when the symmetric key is leaked, the security of the encrypted firmware image FW_ENC, which may be decrypted using the symmetric key, may become vulnerable. In some example embodiments, to enhance security, the firmware vendor may perform key rotation to change the symmetric key periodically or when the symmetric key is leaked. Furthermore, in some example embodiments, it is advantageous, or alternatively desirable, that the storage device 20 be configured to obtain a changed symmetric key by performing key rotation to decrypt the encrypted firmware image using the changed symmetric key.

According to some example embodiments, the firmware vendor may generate an encrypted symmetric key SKEY_ENC by encrypting the symmetric key used to encrypt the firmware image with a public key. In some example embodiments, the firmware vendor may distribute the encrypted symmetric key SKEY_ENC along with the encrypted firmware image FW_ENC.

In some example embodiments, when the storage controller 21 receives a firmware set including an encrypted firmware image FW_ENC and an encrypted symmetric key SKEY_ENC, the storage controller 21 may obtain a symmetric key by decrypting the encrypted symmetric key SKEY_ENC using a secret key PVKEY paired with the public key. In some example embodiments, the storage controller 21 may decrypt the encrypted firmware image FW_ENC using the symmetric key. For example, the storage controller 21 may load the encrypted firmware image FW_ENC, the encrypted symmetric key SKEY_ENC and the secret key PVKEY in a working memory 23, and decrypt the encrypted symmetric key SKEY_ENC and the encrypted firmware image FW_ENC by accessing the working memory 23.

According to some example embodiments, the secret key PVKEY may be stored in an encrypted state in a one-time programmable (OTP) memory 25. The storage controller 21 may encrypt the secret key PVKEY with a unique symmetric key using a physically unclonable function (PUF) chip 24 and may store an encrypted secret key PVKEY_ENC in OTP memory 25. In some example embodiments, the storage controller 21 may decrypt the encrypted secret key PVKEY_ENC using the PUF chip 24 and may use a decrypted secret key PVKEY to decrypt the encrypted symmetric key SKEY_ENC.

According to some example embodiments, since the firmware vendor may transmit the encrypted firmware image FW_ENC and the symmetric key for decrypting the encrypted firmware image FW_ENC together, the firmware vendor may easily perform the key rotation. In some example embodiments, since the symmetric key is transmitted as the encrypted symmetric key SKEY_ENC, the security of the symmetric key may be maintained.

According to some example embodiments, not only the firmware vendor but also the customer may encrypt the firmware image using the customer symmetric key and also transmit the customer symmetric key used to encrypt the firmware image. Accordingly, the security of the firmware image may be further strengthened. In some example embodiments, since a symmetric key of a specific customer does not need to be injected in advance into the OTP memory of the storage device 20, the storage device 20 may be sold not only to the specific customer but also to a variety of customers. In other words, the versatility of the storage device 20 may be improved.

Hereinafter, a firmware image encryption and decryption method according to some example embodiments will be described with reference to FIGS. 2 and 3.

Figure 2:
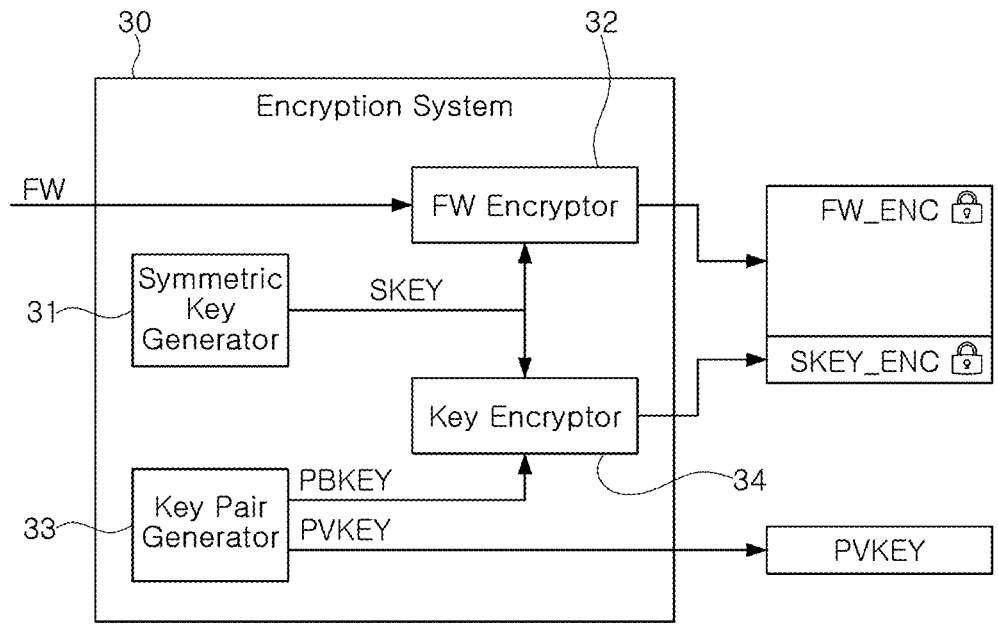
FIG. 2 is a view illustrating a firmware image encryption system according to some example embodiments.

FIG. 2 is a view illustrating a firmware image encryption system according to some example embodiments.

An encryption system 30 of FIG. 2 may be included in the firmware vendor described above. In some example embodiments, the encryption system 30 is included in the firmware vendor, the encryption system 30 may receive a firmware image FW and generate an encrypted firmware image FW_ENC that is transmitted to the host 10.

In some example embodiments, the encryption system 30 may be included in the host 10 described with reference to FIG. 1. In some example embodiments, the encryption system 30 is included in the host 10, the encryption system 30 may receive an encrypted firmware image and generate a double-encrypted firmware image. Hereinafter, a firmware image encryption method will be described using as an example a case in which the encryption system 30 is included in a firmware vendor.

The encryption system 30 may be implemented in any computing system. For example, each of the components of the encryption system 30 includes a hardware module designed through logic synthesis, a software module executed by at least one core, a processing unit including at least one core and a software module, and a combination of those described above, but example embodiments are not limited thereto. The encryption system 30 may receive firmware FW for transmission to the host 10.

As illustrated in FIG. 2, the encryption system 30 may include a symmetric key generator 31, a firmware (FW) encryptor 32, a key pair generator 33, and a key encryptor 34.

In some example embodiments, the symmetric key generator 31 may include a random number generator and output a symmetric key SKEY generated based on a random number. In some example embodiments, the symmetric key generator 31 may change the symmetric key SKEY periodically or in response to a request.

The firmware (FW) encryptor 32 may receive a firmware image FW and generate an encrypted firmware image FW_ENC using the symmetric key SKEY. For example, the firmware encryptor 32 may include a symmetric key encryption engine such as an advanced encryption standard (AES) engine or a data encryption standard (DES) engine, but example embodiments are not limited thereto.

The key pair generator 33 may generate a key pair including a public key PBKEY and a secret key PVKEY. For example, the key pair generator 33 may include a random number generator and may generate a key pair based on a random number.

The key encryptor 34 may output an encrypted symmetric key SKEY_ENC by encrypting the symmetric key SKEY generated by the symmetric key generator 31 using the public key PBKEY generated by the key pair generator 33. For example, the key encryptor 34 may include an asymmetric key encryption engine, such as a Rivest-Shamir-Adleman (RSA) engine, but example embodiments are not limited thereto.

According to some example embodiments, when the encryption system 30 receives the firmware image FW, the encryption system 30 may output encrypted firmware FW_ENC and an encrypted symmetric key SKEY_ENC. For example, the encryption system 30 may generate the encrypted firmware FW_ENC and the encrypted symmetric key SKEY_ENC in the form of one digital envelope and transmit the generated digital envelope to the host 10.

In some example embodiments, the encryption system 30 may further output a secret key PVKEY that may decrypt the encrypted symmetric key SKEY_ENC. The secret key PVKEY output from the encryption system 30 may be injected into the storage device 20 in advance.

Referring to FIG. 2, the firmware image encryption method according to some example embodiments has been explained using, as an example, a process in which the encryption system 30 generates an encrypted firmware image FW_ENC by encrypting the firmware image FW. However, example embodiments of the present inventive concepts are not limited thereto. For example, the encryption system 30 may encrypt the encrypted firmware image FW_ENC, and may also encrypt programs, software, or data. In some example embodiments, data subject to encryption may be referred to as a message MSG.

Figure 3:
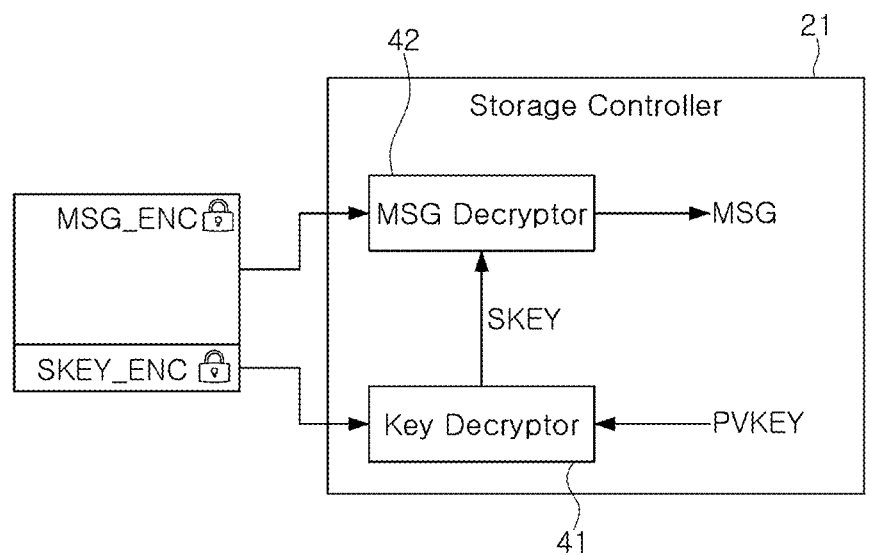
FIG. 3 is a view illustrating a firmware image decryption method according to some example embodiments.

FIG. 3 is a view illustrating a firmware image decryption method according to some example embodiments.

Referring to FIG. 3, a storage controller 21 may receive an encrypted message MSG_ENC and an encrypted symmetric key SKEY_ENC. According to some example embodiments, the message MSG may be restored by decrypting the encrypted symmetric key SKEY_ENC and decrypting the encrypted message MSG_ENC using the decrypted symmetric key. According to some example embodiments, the message MSG may be an encrypted firmware image or a double-encrypted firmware image.

The storage controller 21 may include a key decryptor 41 and a message (MSG) decryptor 42. The key decryptor 41 may generate a symmetric key SKEY by decrypting a symmetric key SKEY_ENC encrypted using an asymmetric key algorithm. In some example embodiments, for the key decryptor 41 to decrypt an encrypted symmetric key SKEY_ENC, a secret key PVKEY may be used.

The message (MSG) decryptor 42 may generate the message MSG by decrypting the encrypted message MSG_ENC using the symmetric key SKEY generated by the key decryptor 41. In some example embodiments, when the message MSG is a firmware image FW, the firmware image FW may be used inside the storage controller 21.

According to some example embodiments, the storage controller 21, which may obtain the symmetric key SKEY from the symmetric key SKEY_ENC encrypted using a secret key PVKEY, may decrypt the encrypted message MSG_ENC using the obtained symmetric key SKEY. Accordingly, in some example embodiments, the encryption system 30 as described with reference to FIG. 2 may encrypt the firmware image FW using a random symmetric key SKEY that is not previously stored in the storage controller 21 and may be provided to the storage controller 21.

Accordingly, in some example embodiments, the encryption system 30 may improve the security of the firmware image FW provided to the storage controller 21 by performing the key rotation of changing the symmetric key SKEY periodically or in response to a request.

According to some example embodiments, the secret key PVKEY used to decrypt the encrypted symmetric key SKEY_ENC may be injected into the storage device 20 in advance. The secret key PVKEY may be stored in an internal storage space while being encrypted with a unique security key of the storage controller 21. A method of injecting the secret key PVKEY into the storage controller 21 and a method of encrypting and decrypting the secret key PVKEY according to some example embodiments will be described below.

According to some example embodiments, a firmware image may be double-encrypted by a firmware vendor and a customer, and a double-encrypted firmware image may be provided to a storage device along with the firmware vendor's encrypted symmetric key and the customer's encrypted symmetric key.

Figure 4:
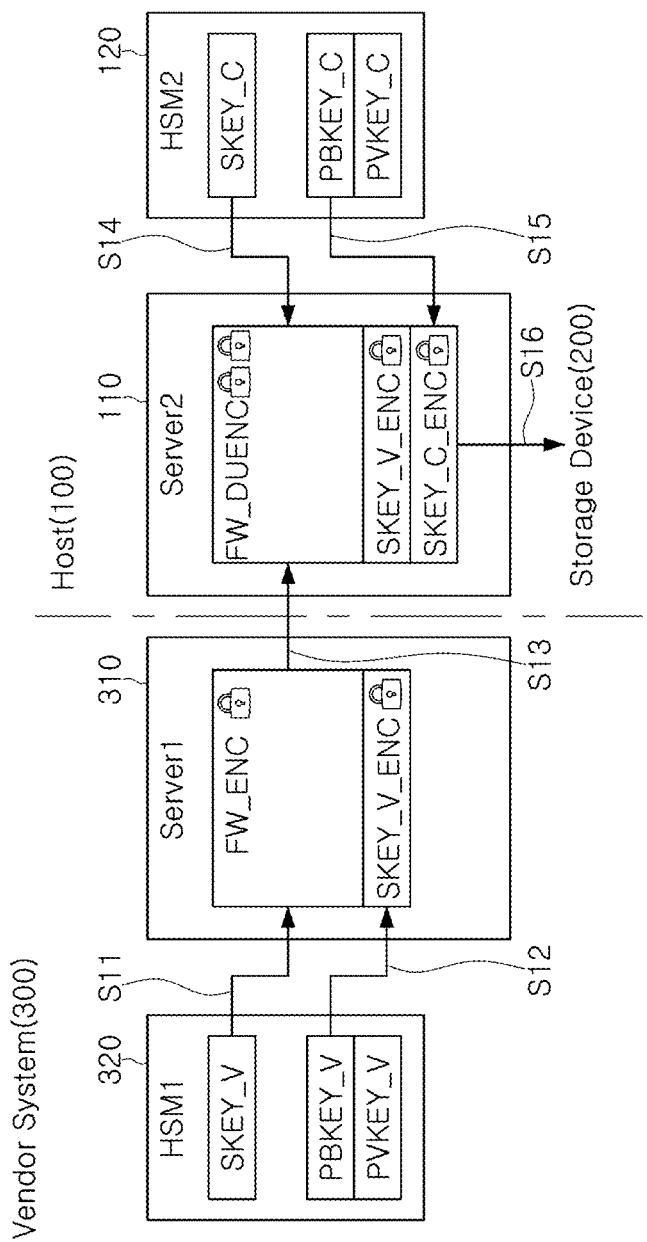
FIG. 4 is a view illustrating a method of providing a double-encrypted firmware image according to some example embodiments.

FIG. 4 is a view illustrating a method of providing a double-encrypted firmware image according to some example embodiments.

Referring to FIG. 4, a vendor system 300 and host 100 are illustrated according to some example embodiments. The host 100 may correspond to the host 10 described with reference to FIG. 1. The vendor system 300 may include a first server (Server1) 310 and a first Hardware Security Module (HSM1) 320. The host 100 may include a second server (Server2) 110 and a second HSM (HSM2) 120.

The first server 310 and the second server 110 may each include at least one core that processes commands. In some example embodiments, the first server 310 and the second server 110 may include an application processor, a microprocessor, a central processing unit (CPU), a processor core, a multicore processor, a multiprocessor, and an application-specific integrated circuit (ASIC) and a field programmable gate array (FPGA), as non-limiting examples.

The first HSM 320 and the second HSM 120 may generate a key pair including a symmetric key, a public key, and a secret key. In some example embodiments, the first HSM 320 and the second HSM 120 may safely store the symmetric key and the key pair.

For example, the first HSM 320 and the second HSM 120 may include the encryption system 30 described with reference to FIG. 2. In some example embodiments, the first HSM 320 and the second HSM 120 may receive a message from the outside, encrypt the message using the symmetric key, encrypt the symmetric key with the public key, and output the encrypted message and the encrypted public key.

The first HSM 320 may generate a first key pair including a first public key PBKEY_V and a first secret key PVKEY_V, and a first symmetric key SKEY_V. In some example embodiments, the second HSM 120 may generate a second key pair including a second public key PBKEY_C and a second secret key PVKEY_C, and a second symmetric key SKEY_C. The first public key PBKEY_V, the first secret key PVKEY_V, and the first symmetric key SKEY_V may be referred to as a vendor public key, a vendor secret key, and a vendor symmetric key, respectively. Furthermore, the second public key PBKEY_C, the second secret key PVKEY_C, and the second symmetric key SKEY_C may be referred to as a customer public key, a customer secret key, and a customer symmetric key, respectively.

The method of providing a double-encrypted firmware image according to some example embodiments may include operations S11 to S16.

In operation S1, the first HSM 320 may generate an encrypted firmware image FW_ENC by encrypting the firmware image using the first symmetric key SKEY_V, and may output the encrypted firmware image FW_ENC to the first server 310.

In operation S12, the first HSM 320 may generate a first encrypted symmetric key SKEY_V_ENC by encrypting the first symmetric key SKEY_V using the first public key PBKEY_V, and may output the first encrypted symmetric key SKEY_V_ENC to the first server 310.

In operation S13, the first server 310 may transmit the encrypted firmware image FW_ENC and the first encrypted symmetric key SKEY_V_ENC to the second server 110.

The second server 110 may double-encrypt the encrypted firmware image FW_ENC to further strengthen the security of the encrypted firmware image FW_ENC. For example, the second server 110 may allow the storage device 200 to execute only the firmware image provided by the second server 110 by double-encrypting and then distributing the encrypted firmware image FW_ENC.

In operation S14, the second HSM 120 may generate a double-encrypted firmware image FW_DUENC by encrypting the encrypted firmware image FW_ENC using the second symmetric key SKEY_C, and may output the double-encrypted firmware image FW_DUENC to the second server 110.

In operation S15, the second HSM 120 may generate a second encrypted symmetric key SKYE_C_ENC by encrypting the second symmetric key SKEY_C using the second public key PBKEY_C, and may output the second encrypted symmetric key SKYE_C_ENC to the second server 110.

In operation S16, the second server 110 may provide a firmware set including the double-encrypted firmware image FW_DUENC, the first encrypted symmetric key SKEY_V_ENC, and a second encrypted symmetric key SKEY_C_ENC, to the storage device 200. For example, the second server 110 may generate the double-encrypted firmware image FW_DUENC, the first encrypted symmetric key SKEY_V_ENC, and the second encrypted symmetric key SKEY_C_ENC in the form of one digital envelope, and may provide the generated digital envelope to the storage device 200.

Meanwhile, in FIG. 4, some example embodiments have been described as an example in which the second HSM 120 generates the double-encrypted firmware image FW_DUENC by performing encryption on the encrypted firmware image FW_ENC and adds the first encrypted symmetric key SKEY_V_ENC and the second encrypted symmetric key SKEY_C_ENC to the double-encrypted firmware image FW_DUENC.

However, example embodiments of the present inventive concepts are not limited thereto. For example, the second HSM 120 may generate the double-encrypted firmware image FW_DUENC by performing encryption on both the encrypted firmware image FW_ENC and the first encrypted symmetric key SKEY_V_ENC, and may add the second encrypted symmetric key SKEY_C_ENC to the double-encrypted firmware image FW_DUENC.

In some example embodiments, the vendor system 300 and the host 100 may inject a first secret key PVKEY_V generated by the first HSM 320 and a second secret key PVKEY_C generated by the second HSM 120 into the storage device 200 so that the storage device 200 may decrypt the first encrypted symmetric key SKEY_V_ENC and the second encrypted symmetric key SKEY_C_ENC.

For example, before providing the storage device 200 to the host 100, the vendor system 300 may obtain the first secret key PVKEY_V from the first HSM 320 and may inject the first secret key PVKEY_V into the storage device 200. In some example embodiments, the host 100 may obtain the second secret key PVKEY_C from the second HSM 120 before providing the storage device 200 to a third party, and may inject the second secret key PVKEY_C into the storage device 200.

In some example embodiments, the first secret key PVKEY_V and the second secret key PVKEY_C may be stored in the storage device 200 while being encrypted with a unique security key of the storage device 200. Accordingly, in some example embodiments, even after the storage device 200 is provided to the third party, the first secret key PVKEY_V and the second secret key PVKEY_C may be prevented from leaking.

According to some example embodiments, when the security of the first secret key PVKEY_V and the second secret key PVKEY_C is maintained, the host 100 may provide a first symmetrical key SKEY_V and a second symmetrical key SKEY_C to the storage device 200 together with the double-encrypted firmware image FW_DUENC without leaking the first symmetrical key SKEY_V and the second symmetrical key SKEY_C.

Since, in some example embodiments, the vendor system 300 and the host 100 do not need to store the first symmetric key SKEY_V and the second symmetric key SKEY_C in the storage device 200 in advance to decrypt the double-encrypted firmware image FW_DUENC, the vendor system 300 and the host 100 may easily perform the key rotation of the first symmetrical key SKEY_V and the second symmetrical key SKEY_C even after the storage device 200 is supplied to the third party.

According to some example embodiments, the security of the first symmetric key SKEY_V and the second symmetric key SKEY_C may be improved, and even if the first symmetric key SKEY_V and the second symmetric key SKEY_C are leaked, since the first symmetric key SKEY_V and the second symmetric key SKEY_C may be changed, the security of the firmware image may be improved.

Hereinafter, a storage controller, a storage device, and a method of operating the same according to some example embodiments will be described in more detail with reference to FIGS. 5 to 12.

Figure 5:
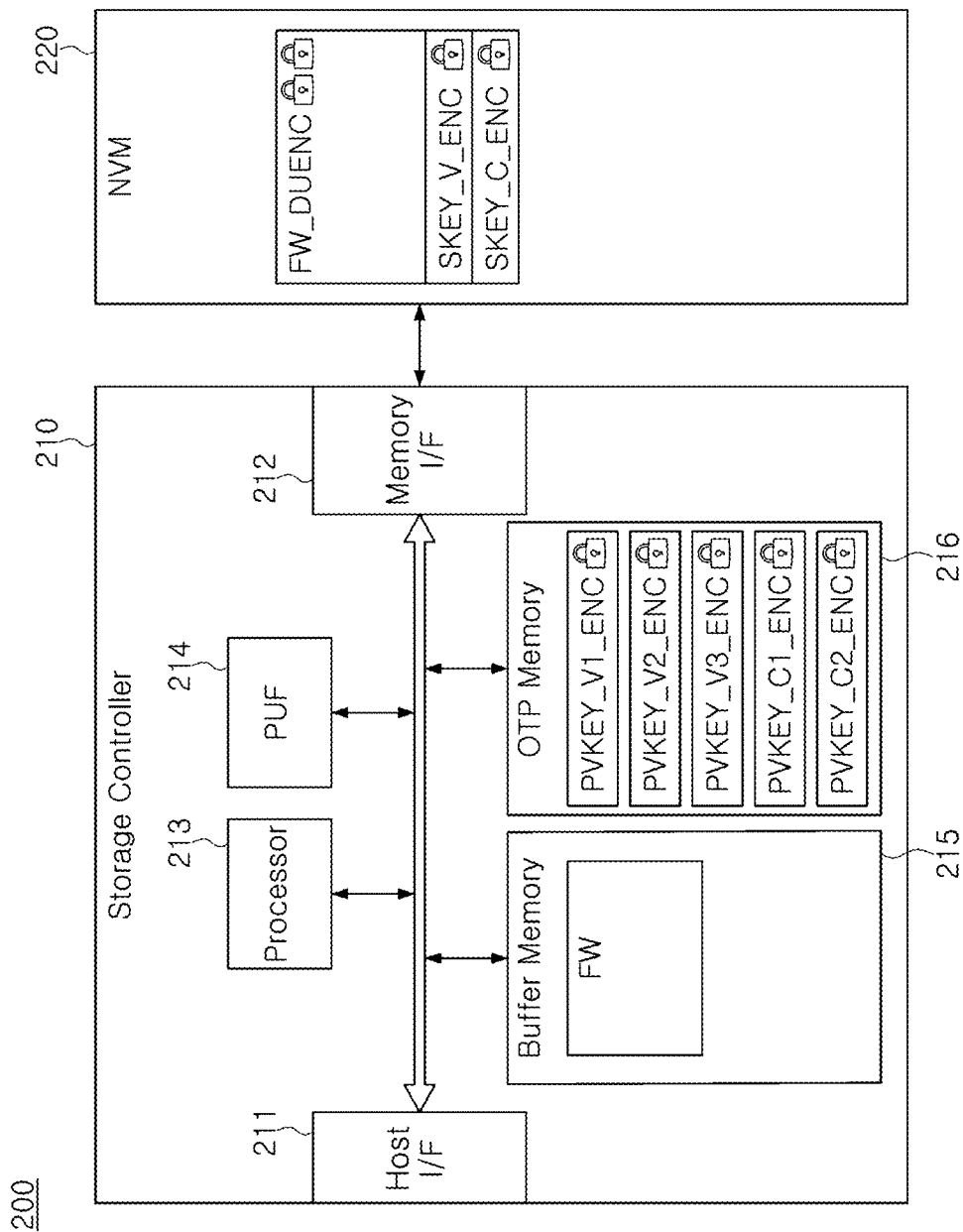
FIG. 5 is a view illustrating a storage device according to some example embodiments.

FIG. 5 is a view illustrating a storage device according to some example embodiments.

A storage device 200 may include a storage controller 210 and a non-volatile memory device (NVM) 220. The storage device 200, the storage controller 210, and the non-volatile memory 220 of FIG. 5 correspond to the storage device 20, the storage controller 21, and the non-volatile memory device 22 described with reference to FIG. 1, respectively.

The storage controller 210 may include a host interface 211, a memory interface 212, a processor 213, a PUF chip 214, a buffer memory 215, and an OTP memory 216.

The host interface 211 may transmit or receive packets to or from the host 110. The packets transmitted from the host 110 to the host interface 211 may include commands, data to be recorded in the non-volatile memory 220, or data to be recorded in a storage space in the storage controller 210, and the packets transmitted from the host interface 211 to the host 110 may include a response to a command or data read from the non-volatile memory 220.

The memory interface 212 may transmit the data to be recorded in the non-volatile memory 220, or may receive the data read from the non-volatile memory 220. The memory interface 212 may be implemented to comply with standard protocols such as Toggle or ONFI, but example embodiments are not limited thereto.

In some example embodiments, the processor 213 may further include a hardware accelerator designed to perform predefined operations at high speed, and an input/output (I/O) interface for providing a communication channel with external components of the processor 213. According to some example embodiments, the components of the processor 213 may be integrated into a single chip or a single die, and the processor 213 may be referred to as a system-on-chip (SoC).

According to some example embodiments, the components of the processor 213 may be integrated into two or more chips included in one package, and the processor 213 may be referred to as a system-in-package (SiP). The processor 213 may also be referred to as a Miro Control Unit (MCU).

According to some example embodiments, the PUF chip 214 may have a unique security key based on hardware characteristics of a semiconductor device. For example, the PUF chip 214 may include a PUF cell array including a plurality of PUF cells. In some example embodiments, due to process changes, the PUF cell arrays of a plurality of semiconductor devices may have subtle structural differences, and data output from the PUF cell arrays may be different from each other. For example, each of the semiconductor devices may generate a unique security key using the PUF cell array, and the security key cannot be leaked to the outside.

The PUF chip 214 may encrypt a message using a security key generated by the PUF cell array and decrypt the encrypted message using the security key.

The buffer memory 215 may temporarily store data to be stored in the non-volatile memory 220 or data output from the non-volatile memory 220. For example, the buffer memory 215 may temporarily store a firmware image FW downloaded from the host 100 or a firmware image FW loaded from the non-volatile memory 220. According to some example embodiments, the buffer memory 215 may include a volatile memory such as a dynamic random access memory (DRAM), but example embodiments are not limited thereto.

In some example embodiments, the storage controller 210 may further include an operating memory for storing data used by the processor 213. For example, the firmware image FW may be loaded into the operating memory, and the processor 213 may execute the firmware using the firmware image FW loaded into the operating memory.

The OTP memory 216 may non-volatilely store unique data of the storage controller 210. For example, the OTP memory 216 may store a plurality of first encrypted secret keys (PVKEY_V1_ENC, PVKEY_V2_ENC and PVKEY_V3_ENC) and a plurality of second encrypted secret keys (PVKEY_C1_ENC and PVKEY_C2_ENC).

In some example embodiments, the first HSM 320 described with reference to FIG. 4 may generate a plurality of first secret keys, and the plurality of first secret keys may be encrypted by the PUF chip 214, thus generating the plurality of first encrypted secret keys (PVKEY_V1_ENC, PVKEY_V2_ENC and PVKEY_V3_ENC). In some example embodiments, the second HSM 120 described with reference to FIG. 4 may generate a plurality of second secret keys, and the plurality of second secret keys may be encrypted by the PUF chip 214, thereby generating the plurality of second encrypted secret keys (PVKEY_C1_ENC and PVKEY_C2_ENC).

In some example embodiments, the non-volatile memory device 220 may include a firmware set including the double-encrypted firmware image FW_DUENC, the first encrypted symmetric key SKEY_V_ENC, and the second encrypted symmetric key SKEY_C_ENC, as described with reference to FIG. 4. For example, the firmware set including the double-encrypted firmware image FW_DUENC, the first encrypted symmetric key SKEY_V_ENC, and the second encrypted symmetric key SKEY_C_ENC may be stored in the non-volatile memory device 220 in response to a request from the host 100.

The first encrypted symmetric key SKEY_V_ENC may be decrypted by one of the plurality of first encrypted secret keys (PVKEY_V1_ENC, PVKEY_V2_ENC and PVKEY_V3_ENC), and the second encrypted symmetric key SKEY_C_ENC may be decrypted by one of the plurality of second encrypted secret keys (PVKEY_C1_ENC and PVKEY_C2_ENC). The plurality of first encrypted secret keys (PVKEY_V1_ENC, PVKEY_V2_ENC and PVKEY_V3_ENC) and the plurality of second encrypted secret keys (PVKEY_C1_ENC and PVKEY_C2_ENC) stored in the OTP memory 216 may be referred to as encrypted candidate secret keys.

The firmware image FW may be stored in a double-encrypted state in the non-volatile memory device 220, and the double-encrypted firmware image FW_DUENC may be decrypted only when the firmware is executed, thereby strengthening the security of the firmware image.

Figure 6:
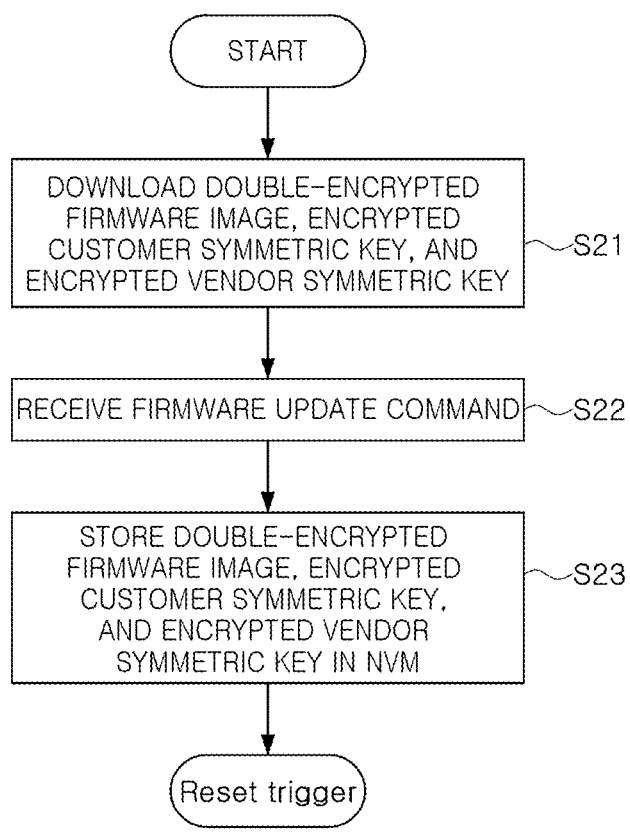
FIG. 6 is a flowchart illustrating a firmware update method according to some example embodiments.

FIG. 6 is a flowchart showing a firmware update method according to some example embodiments.

In operation 521, a storage controller 210 may download an update firmware set including a double-encrypted firmware image generated by encrypting the updated firmware image using a first symmetric key and a second symmetric keys, a first encrypted symmetric key, and a second encrypted symmetric key.

For example, the host 100 may provide a firmware download command including the firmware set to the storage controller 210. The storage controller 210 may buffer the firmware set included in a firmware download command in the buffer memory 215.

In operation S22, the storage controller 210 may receive a firmware update command from the host 100. The firmware update command may also be referred to as a firmware commit command.

In operation S23, the storage controller 210 may store the firmware set buffered in the buffer memory 215 in the non-volatile memory device 220 in response to the firmware update command.

According to some example embodiments, before storing the firmware set in the non-volatile memory device 220, the storage controller 210 may decrypt the double-encrypted firmware image included in the above firmware set using the first encrypted symmetric key and the second encrypted symmetric key. In some example embodiments, the storage controller 210 may store the firmware set in the non-volatile memory device 220 when the decryption is performed normally.

The storage controller 210 may store the firmware set in the non-volatile memory device 220 and then reset the storage device 200.

The double-encrypted firmware image stored in the non-volatile memory device 220 may be decrypted when the storage device 200 boots, and the firmware may be executed using the decrypted firmware image.

Hereinafter, a firmware execution method according to some example embodiments will be described in detail with reference to FIGS. 7 and 8.

Figure 7:
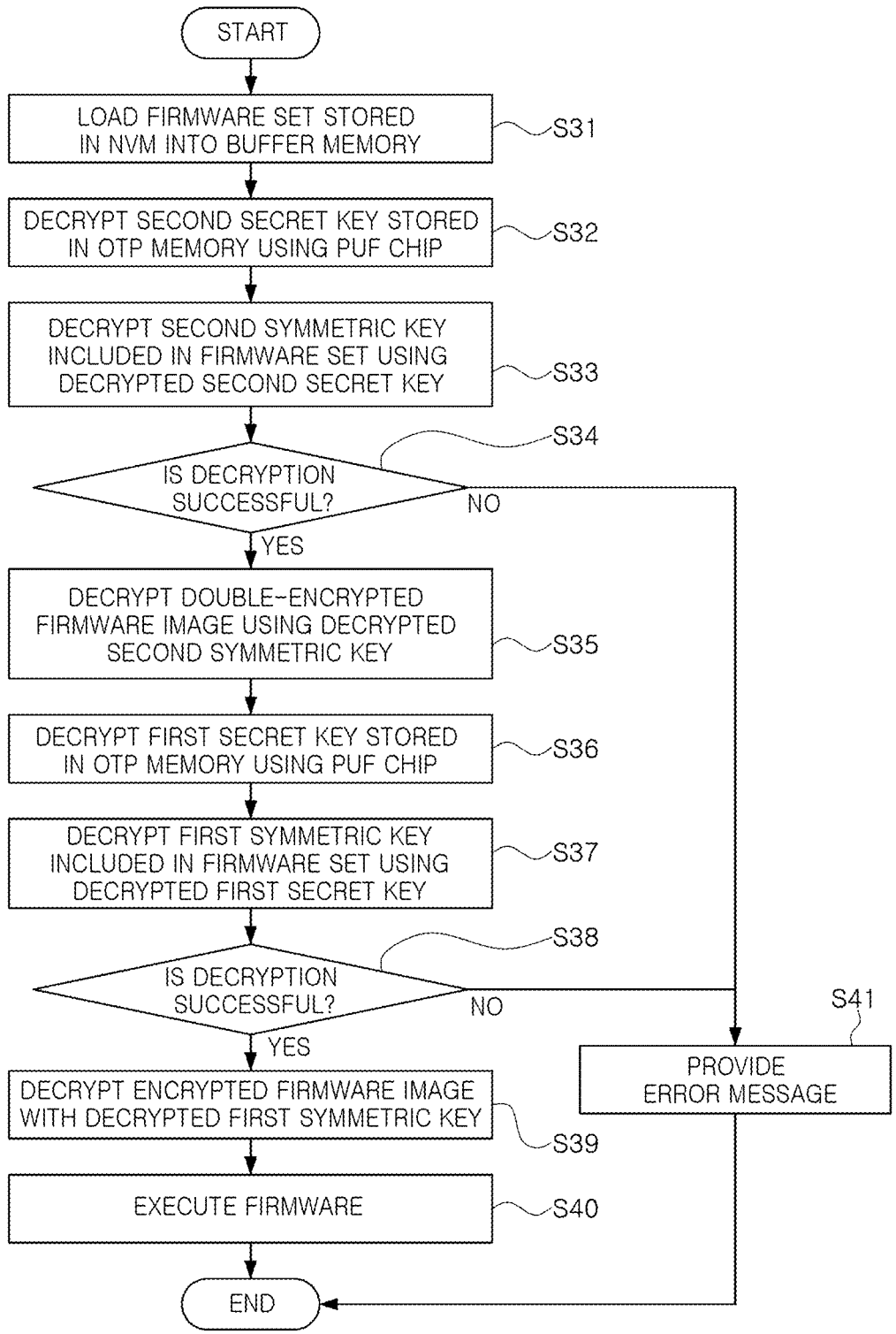
FIG. 7 is a flowchart illustrating a firmware execution method according to some example embodiments.

FIG. 7 is a flowchart showing a firmware execution method according to some example embodiments. Furthermore, FIG. 8 is a view illustrating a firmware execution method according to some example embodiments.

The firmware execution method according to some example embodiments may be initiated in response to a reset of a storage device 200. For example, the firmware execution method may be initiated in response to a power-on reset (POR), or may be initiated in response to a reset trigger described with reference to FIG. 6.

Figure 8:
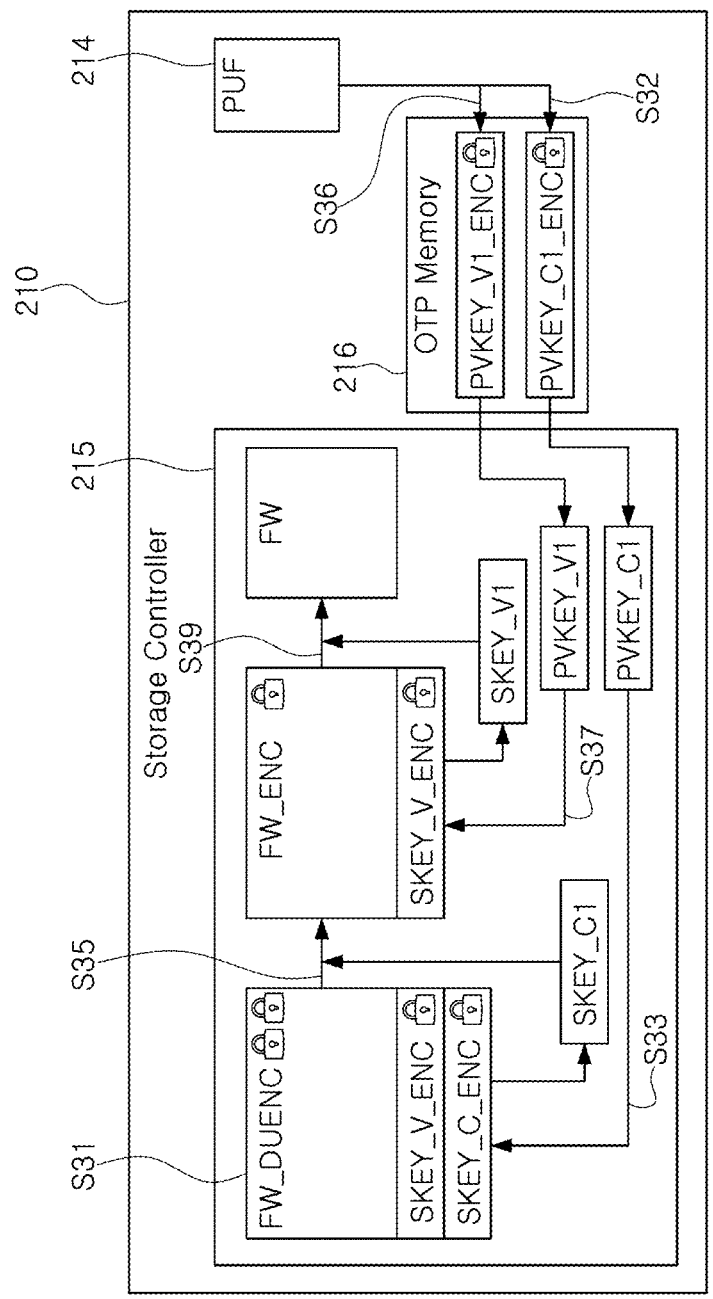
FIG. 8 is a diagram illustrating a firmware execution method according to some example embodiments.

Referring to FIGS. 7 and 8 together, in operation S31, a storage controller 210 may load a firmware set stored in a non-volatile memory device 220 into a buffer memory 215. The firmware set loaded into the buffer memory 215 may include a double-encrypted firmware image FW_DUENC, a first encrypted symmetric key SKEY_V_ENC, and a second encrypted symmetric key SKEY_C_ENC.

A first encrypted symmetric key SKEY_V_ENC may be decrypted using one of a plurality of first encrypted secret keys stored in an OTP memory 216 described with reference to FIG. 5, and a second encrypted symmetric key SKEY_C_ENC may be decrypted using one of a plurality of second encrypted secret keys stored in the OTP memory 216.

According to some example embodiments, the firmware set may further store information indicating by which secret key the first encrypted symmetric key SKEY_V_ENC and the second encrypted symmetric key SKEY_C_ENC may be decrypted, respectively. For example, each of the plurality of first encrypted secret keys and the plurality of second encrypted secret keys may be mapped to an identifier, and the information may include an identifier of the secret key. In some example embodiments of FIG. 8, examples of secret keys capable of decrypting the first encrypted symmetric key SKEY_V_ENC and the second encrypted symmetric key SKEY_C_ENC include a first encrypted secret key PVKEY_C1_ENC and a second encrypted secret key PVKEY_V2_ENC selected from a plurality of encrypted candidate secret keys.

In operation S32, the storage controller 210 may generate a first secret key PVKEY_C1 by decrypting the first encrypted secret key PVKEY_C1_ENC stored in the OTP memory 216 using the PUF chip 214.

In operation S33, the storage controller 210 may decrypt the second encrypted symmetric key SKEY_C_ENC included in the firmware set using a decrypted second secret key PVKEY_C.

In operation S34, the storage controller 210 may determine whether the decryption of the second symmetric key SKEY_C was successful. For example, even if information that the second encrypted symmetric key SKEY_C_ENC may be decrypted using the first encrypted secret key PVKEY_C1_ENC is stored in the firmware set, the second encrypted secret key PVKEY_C1_ENC in the storage controller 210 may be a secret key that has been revoke.

In some example embodiments, when the second encrypted secret key PVKEY_C1_ENC is a revoked secret key, the decryption of the second encrypted symmetric key SKEY_C_ENC using the second encrypted secret key PVKEY_C1_ENC may not be performed, and the storage controller 210 may determine that the decryption of the second symmetric key SKEY_C has failed.

In some example embodiments, when it is determined that the decryption of the second symmetric key SKEY_C fails ("No" in operation S34), in operation 541, the storage controller 210 provides an error message to the host 100 and may stop the execution of firmware.

In some example embodiments, when it is determined that the decryption of the second symmetric key SKEY_C is successful ("Yes" in operation S34), in operation S35, the storage controller 210 may decrypt a double-encrypted firmware image FW_DUENC using the decrypted second symmetric key SKEY_C. The storage controller 210 may generate an encrypted firmware image FW_ENC by decrypting the double-encrypted firmware image FW_DUENC.

In operation S36, the storage controller 210 may generate a first secret key PVKEY_V1 by decrypting a first encrypted secret key PVKEY_V1_ENC stored in the OTP memory 216 using the PUF chip 214.

In operation S37, the storage controller 210 may decrypt a first encrypted symmetric key SKEY_V1_ENC included in the firmware set using the first secret key PVKEY_V1.

In operation S38, the storage controller 210 may determine whether decryption of a first symmetric key SKEY_V is successful. As described in operation S34, whether to decrypt the first symmetric key SKEY_V may be determined depending on whether the first encrypted symmetric key SKEY_V1_ENC is revoked.

In some example embodiments, when it is determined that decryption of the first symmetric key SKEY_V fails ("No" in operation S38), in operation 541, the storage controller 210 may provide an error message to the host 100 and may stop the execution of firmware.

In some example embodiments, when it is determined that the decryption of the first symmetric key SKEY_V is successful ("Yes" in operation S38), in operation S39, the storage controller 210 may decrypt the encrypted firmware image FW_ENC with the decrypted first symmetric key SKEY_V. The storage controller 210 may generate a firmware image FW by decrypting the encrypted firmware image FW_ENC.

In operation 540, the storage controller 210 may execute firmware using the firmware image FW. For example, the firmware image FW stored in the buffer memory 216 may be loaded into an operating memory, and the processor 213 may execute the firmware image FW loaded into the operating memory.

In some example embodiments, a first secret key PVKEY_V1, a second secret key PVKEY_C1, a first symmetric key SKEY_V1, and a second symmetric key SKEY_C1, generated by performing operations S31 to S39 by the storage controller 210, may be removed from the buffer memory 216, at least when the generation of the firmware image FW is completed. Accordingly, in some example embodiments, the security of the first secret key PVKEY_V1, the second secret key PVKEY_C1, the first symmetric key SKEY_V1, and the second symmetric key SKEY_C1 may be strengthened.

According to some example embodiments, when the first secret key PVKEY_V1 or the second secret key PVKEY_C1 is leaked, an attacker may encrypt a forged firmware image with his or her symmetric key and may encrypt the symmetric key with a first public key PBKEY_V1 or a second public key PBKEY_C2 to generate a forged firmware set. When the attacker provides the forged firmware set to the storage controller 200 and induces the forged firmware image to be used in the storage device 200, the storage device 200 may perform an operation intended by the attackers.

According to some example embodiments, a first secret key and a second secret key stored in an encrypted state in an OTP memory 216 may be injected or revoked by a firmware vendor 300 or a host 100. For example, when the first secret key or the second secret key is leaked, the firmware vendor 300 or the host 100 may revoke the leaked secret key. The storage device 200 may prevent the use of the forged firmware image by prohibiting decryption of the symmetric key using the revoked secret key.

9A and 9B are views illustrating a secret key injection method according to some example embodiments.

According to some example embodiments, a storage controller 210 illustrated in FIGS. 9A and 9B may correspond to the storage controller 210 described with reference to FIG. 5.

Figure 9A:
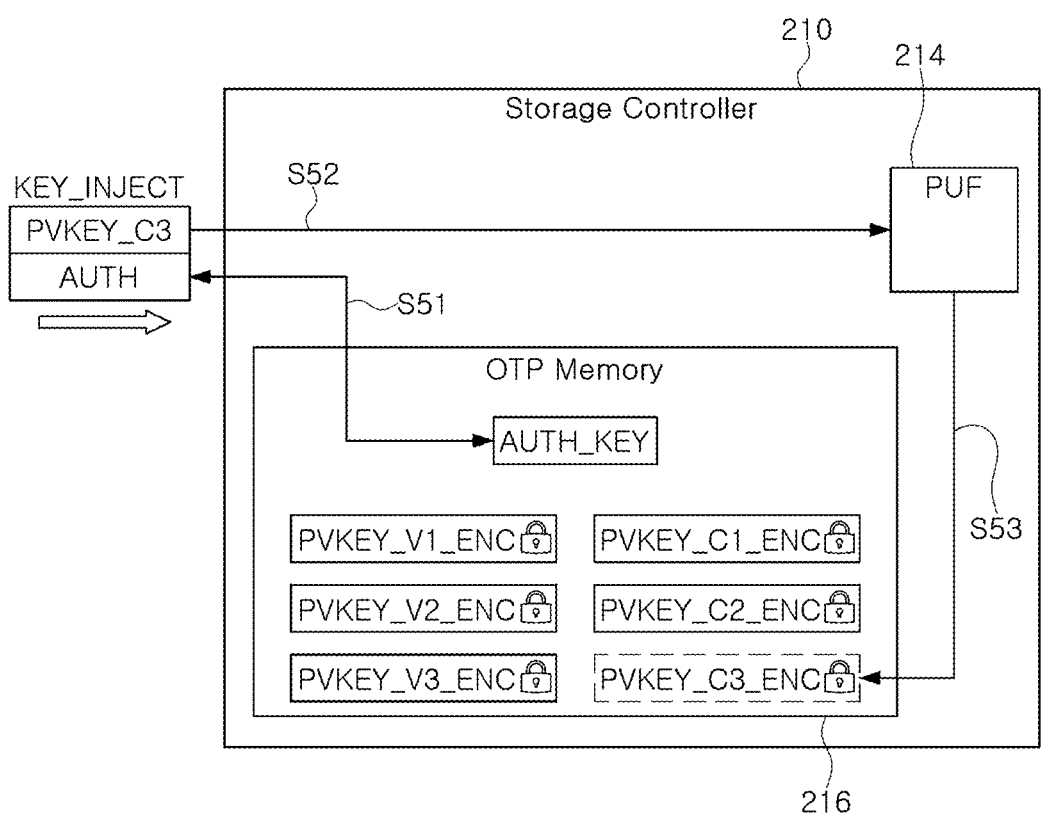
FIGS. 9A and 9B are diagrams for explaining a secret key injection method according to some example embodiments.

Referring to FIG. 9A, a firmware vendor 300 or a host 100 may inject a secret key into an OTP memory 216 by providing a key injection command KEY_INJECT to a storage device 200.

For example, the key injection command KEY_INJECT may be a vendor specific command defined by the firmware vendor 300. The key injection command KEY_INJECT may include a secret key to be injected and an authentication means AUTH. FIG. 9A illustrates an example in which a second secret key PVKEY_C3 generated by the host 100 is injected.

The storage controller 210 may inject the second secret key PVKEY_C3 into the OTP memory 216 by performing operations S51 to S53.

In operation S51, the storage controller 210 may receive the key injection command KEY_INJECT, and may verify whether the key injection command KEY_INJECT is a command injected by a legitimate host 100, using an authentication key AUTH_KEY stored in the OTP memory 216 and an authentication means AUTH included in the key injection command KEY_INJECT.

In some example embodiments, the authentication means AUTH may be a password, and the authentication key AUTH_KEY may be a password stored in plain text or a password stored in an encrypted form. In some example embodiments, the authentication means AUTH may be an electronic signature signed with a secret key, and the authentication key AUTH_KEY may be a public key paired with the secret key.

In some example embodiments, when verification of the key injection command KEY_INJECT is completed, the storage controller 210 may encrypt a new secret key PVKEY_C3 to be injected using a PUF chip 214 in operation S52. For example, when the new secret key PVKEY_C3 is input to the PUF chip 214, the PUF chip 214 may output the encrypted new secret key PVKEY_C3_ENC.

In operation S53, the storage controller 210 may store the encrypted new secret key PVKEY_C3_ENC in the OTP memory 216.

FIG. 9A illustrates an example in which the authentication key AUTH_KEY is stored in the OTP memory 216 according to some example embodiments, but the present inventive concepts are not limited thereto.

Figure 9B:
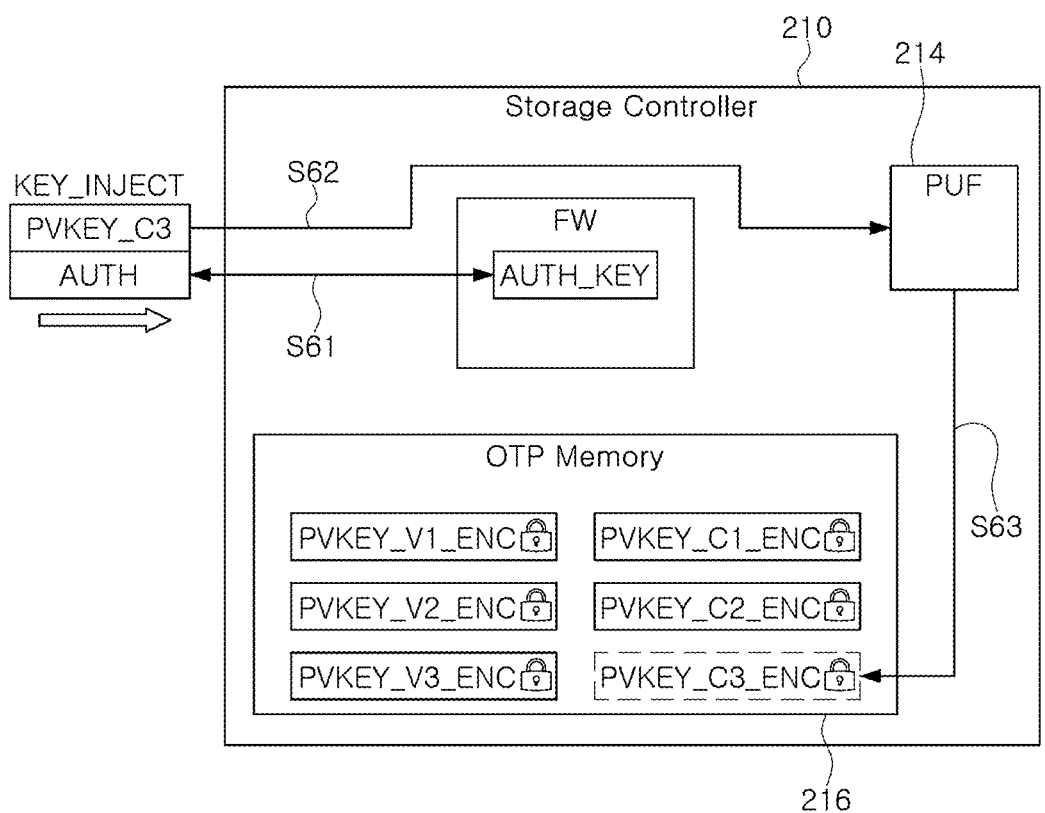

Referring to FIG. 9B, in some example embodiments, a firmware image FW used to execute firmware in the storage controller 210 may include an authentication key AUTH_KEY. In operation 561, the storage controller 210 may verify a key injection command KEY_INJECT using an authentication means AUTH included in the key injection command KEY_INJECT and the authentication key AUTH_KEY included in the firmware image FW. Operations S62 and S63 may be the same as operations S52 and S53 described with reference to FIG. 9A. In some example embodiments, when the firmware image FW includes the authentication key AUTH_KEY, a firmware vendor 300 may change the authentication key AUTH_KEY by changing the firmware image FW.

According to some example embodiments, a secret key injected from the outside may be encrypted by the PUF chip 214 and injected into the OTP memory 216, and accordingly, even after the storage device 200 is supplied to a third party, the security of the secret key may be maintained.

Meanwhile, in examples of FIGS. 9A and 9B, a new secret key PVKEY_C3 included in the key injection command KEY_INJECT may be plain text. Since the key injection command KEY_INJECT may be injected by the firmware vendor 300 or the host 100 before the storage device 200 is supplied to the third party, even if the key injection command KEY_INJECT include a secret key of the plaintext, the risk of leakage of the secret key may be low while providing the key injection command KEY_INJECT to the storage device 200.

The firmware vendor 300 and the host 100 may support replacement of the secret key for decrypting the encrypted symmetric key by injecting a plurality of secret keys into the storage device 200 before supplying the storage device 200 to the third party. However, the present invention is not limited to a case in which the new secret key PVKEY_C3 included in the key injection command KEY_INJECTION is plaintext.

Figure 10A:
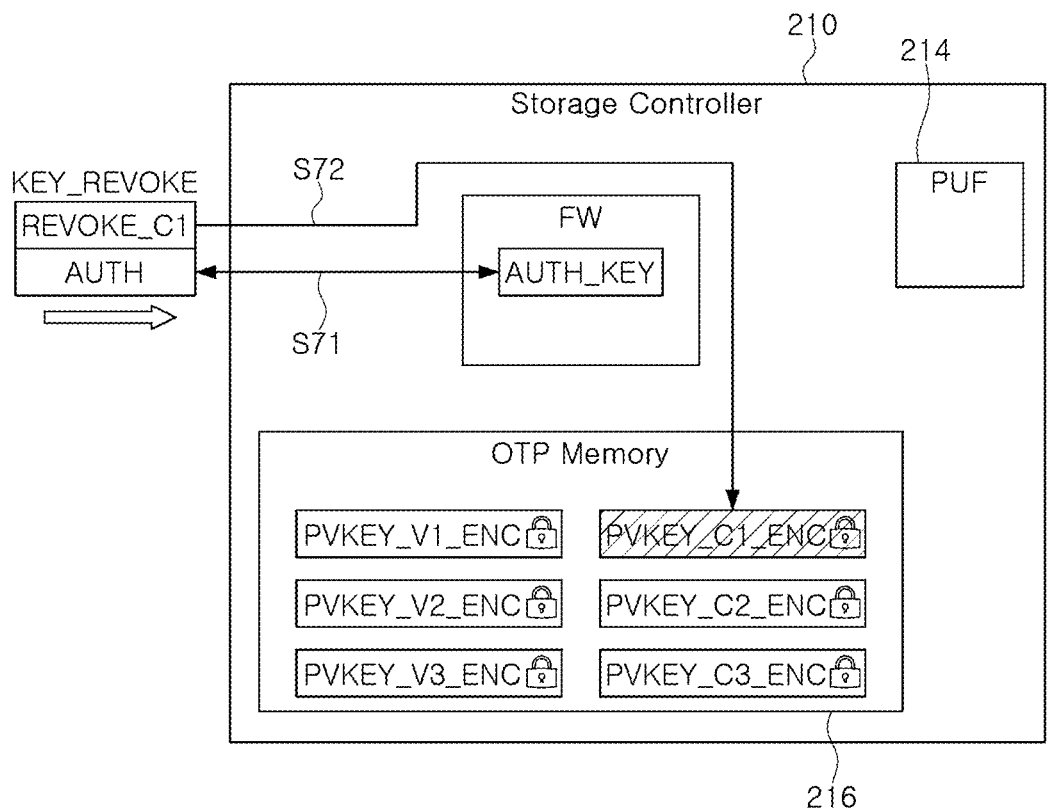
FIGS. 10A and 10B are diagrams for describing a method of revoking a secret key according to some example embodiments.
Figure 10B:
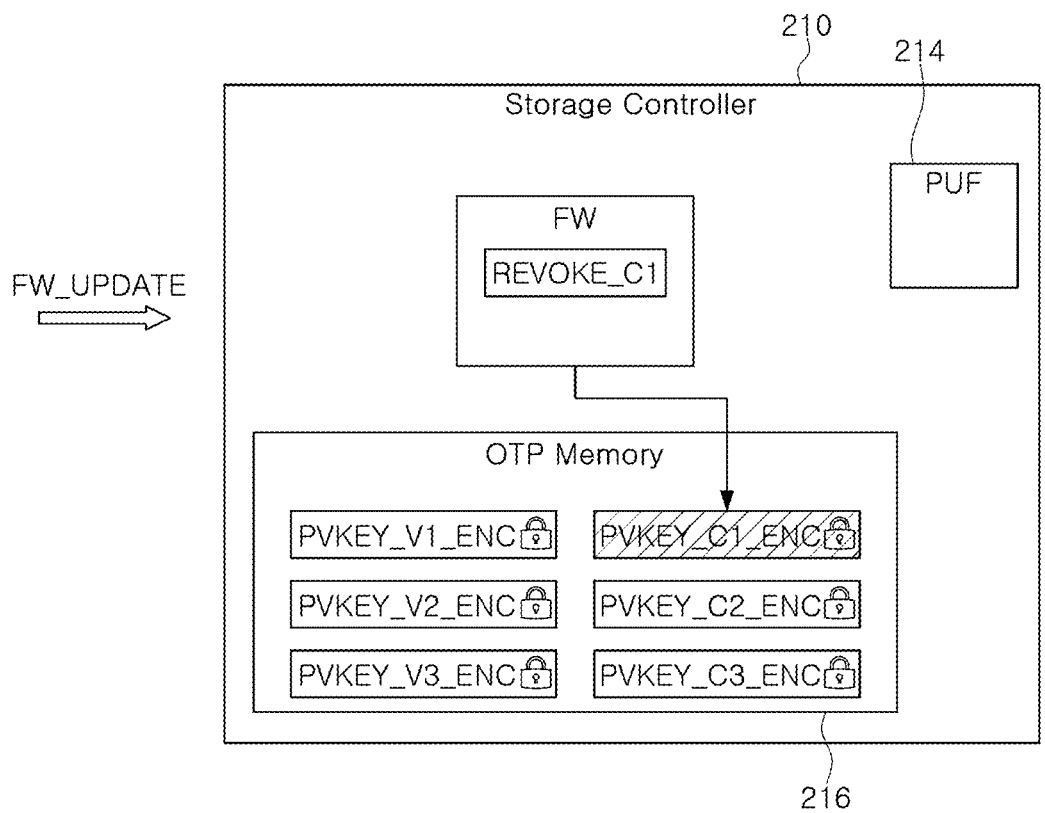

FIGS. 10A and 10B are views illustrating a method of revoking a secret key according to some example embodiments.

A storage controller 210 illustrated in FIGS. 10A and 10B may correspond to the storage controller 210 described with reference to FIG. 5.

Referring to FIG. 10A, in some example embodiments, a firmware vendor 300 or a host 100 may inject a secret key into an OTP memory 216 by providing a key revocation command KEY_REVOKE to a storage device 200. The key revocation command KEY_REVOKE may be a vendor-specific command defined by the firmware vendor 300. For example, as illustrated in FIG. 10A, the key revocation command KEY_REVOKE may include a command REVOKE_C1 for revoking a second secret key PVKEY_C1 injected by the host 100.

The storage controller 210 may revoke a secret key stored in an OTP memory 216 by performing operations S71 and S72.

In operation S71, the storage controller 210 may receive the key revocation command KEY_REVOKE, and may verify whether the key revocation command KEY_REVOKE is a command injected by a legitimate host 100 using an authentication manner AUTH included in the key revocation command and an authentication key AUTH_KEY stored in the OTP memory 216.

In operation S72, the storage controller 210 may revoke a second encrypted secret key PVKEY_C1_ENC stored in the OTP memory 216 in response to the key revocation command KEY_REVOKE.

In some example embodiments, the storage controller 210 may revoke the second encrypted secret key PVKEY_C1_ENC by overwriting dummy data in a region in which the second encrypted secret key PVKEY_C1_ENC of the OTP memory 216 is stored. In some example embodiments, the storage controller 210 may indicate a state in which the second encrypted secret key PVKEY_C1_ENC has been revoked by storing an identifier of the second encrypted secret key PVKEY_C1_ENC in a designated region of the OTP memory 216.

While FIG. 10A illustrates an example of providing a key revocation command KEY_REVOKE to revoke a secret key according to some example embodiments, the present inventive concepts are not limited thereto.

Referring to FIG. 10B, in some example embodiments, the key revocation command REVOKE_C1 may be included in a firmware image FW. For example, a firmware vendor 300 may insert a key revocation command REVOKE_C1 into the firmware image FW and may distribute the firmware image FW to a host 100 so that the host 100 update firmware of the storage device 200.

The host 100 may update the firmware of the storage device 200 by providing a firmware update command FW_UPDATE to the storage device 200. A storage controller 210 may revoke the second encrypted secret key PVKEY_C1_ENC stored in an OTP memory 216 by executing the key revoke command REVOKE_C1 included in the firmware image FW.

According to some example embodiments, in order to update the firmware of the storage device 200, the storage device 200 may be provided with a firmware image encrypted using a symmetric key and an encrypted symmetric key generated by encrypting the symmetric key with a public key.

The firmware vendor 300 may safely transmit the symmetric key used to decrypt the firmware image together with the firmware image. Accordingly, a key rotation of the symmetric key may be easily performed, and the security of the firmware image may be improved. Furthermore, since the host 100 may also encrypt the firmware image using the symmetric key generated by the host 100, the convenience for the host 100 to encrypt the firmware image may be improved.

According to some example embodiments, the storage device 200 may encrypt and store a secret key for decrypting the encrypted symmetric key using a PUF chip. The storage device 200 may encrypt and store a plurality of candidate secret keys, and may revoke some of the plurality of candidate secret keys in response to a command from the host 100. Accordingly, the security of the secret key may be improved.

As described herein, one or more of the elements disclosed above may include or be implemented in one or more processing circuitries such as hardware including logic circuits; a hardware/software combination such as a processor executing software; or a combination thereof. For example, the processing circuitries more specifically may include, but are not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Any of the memories described herein may be a non-volatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

The present inventive concepts are not limited to the above-described example embodiments and the accompanying drawings but is defined by the appended claims. Therefore, it will be understood that those of ordinary skill in the art may make various replacements, modifications, or changes in form and details without departing from the spirit and scope of the present inventive concepts defined by the appended claims, and these replacements, modifications, or changes in form and details shall be construed as being included in the spirit and scope of the present inventive concepts.

What is claimed is:

1. A storage device, comprising:
A storage device, comprising:
a non-volatile memory configured to store a firmware set including a firmware image encrypted using a symmetric key and an encrypted symmetric key generated by encrypting the symmetric key using a public key; and
a storage controller configured to control the non-volatile memory,
wherein the storage controller comprises
a physically unclonable function (PUF) chip having a unique security key, and
a one-time programmable (OTP) memory configured to store an encrypted secret key generated by encrypting a secret key paired with the public key using the PUF chip, and
wherein the storage controller is configured to obtain the firmware image by loading the firmware set, provide the encrypted secret key to the PUF chip, receive the secret key from the PUF chip, generate the symmetric key by decrypting the encrypted symmetric key using the secret key, and decrypt the encrypted firmware image using the symmetric key.

2. The storage device of claim 1, wherein the storage controller is configured to
receive an update firmware set including an update firmware image encrypted using the symmetric key and the encrypted symmetric key generated by encrypting the symmetric key using the public key, and store the update firmware set in the non-volatile memory in response to an update firmware command.

3. The storage device of claim 1, wherein the storage controller is configured to
receive an update firmware set including an update firmware image encrypted using the symmetric key and the encrypted symmetric key generated by encrypting the symmetric key using the public key, decrypt the encrypted update firmware image in response to an update firmware command, and store the update firmware set in the non-volatile memory when the decryption is performed normally.

4. The storage device of claim 1, wherein the storage controller is configured to
after obtaining the firmware image, remove the received secret key and the generated symmetric key from an inside of the storage controller.

5. The storage device of claim 1, wherein the OTP memory is configured to
store a plurality of encrypted candidate secret keys, and the storage controller is configured to
select one of the plurality of encrypted candidate secret keys as the encrypted secret key based on an identifier of the secret key included in the firmware set.

6. The storage device of claim 1, wherein the storage controller is configured to
stop decryption of the encrypted secret key in response to the encrypted secret key being a revoked secret key.

7. The storage device of claim 1, wherein the storage controller is configured to
receive a key injection command including a new secret key and an authenticator, verify the key injection command using the authenticator and an authentication key stored in the storage controller, provide the new secret key to the PUF chip, receive an encrypted new secret key from the PUF chip, and store the encrypted new secret key in the OTP memory.

8. The storage device of claim 7, wherein the OTP memory is configured to store the authentication key.

9. The storage device of claim 7, wherein the firmware image includes the authentication key.

10. The storage device of claim 1, wherein the storage controller is configured to
receive a key revocation command including a revocation command for making a request for revoking the secret key and an authenticator, verify the key revocation command using the authenticator and an authentication key stored in the storage controller, and revoke the encrypted secret key stored in the OTP memory.

11. The storage device of claim 10, wherein the storage controller is configured to
revoke the encrypted secret key by overwriting dummy data in a region in which the encrypted secret key is stored in the OTP memory.

12. The storage device of claim 10, wherein the storage controller is configured to
indicate a state in which the encrypted secret key has been revoked by storing an identifier of the encrypted secret key in a designated region in the OTP memory.

13. A booting method of a storage device, comprising:
loading a firmware set stored in a non-volatile memory device into a buffer memory;
generating a customer secret key by decrypting an encrypted customer secret key stored in a one-time programmable (OTP) memory using a physically unclonable function (PUF) chip;
generating a customer symmetric key by decrypting an encrypted customer symmetric key included in the firmware set using the customer secret key;
generating an encrypted firmware image by decrypting a double-encrypted firmware image included in the firmware set using the customer symmetric key;
generating a vendor secret key by decrypting an encrypted vendor secret key stored in the OTP memory using the PUF chip;
generating a vendor symmetric key by decrypting an encrypted vendor symmetric key included in the firmware set using the vendor secret key;
generating a firmware image by decrypting the encrypted firmware image using the vendor symmetric key; and
executing firmware using the generated firmware image.

14. The booting method of the storage device of claim 13, further comprising:
outputting an error message and terminating the booting in response to the encrypted customer secret key or the encrypted vendor secret key being revoked.

15. The booting method of the storage device of claim 13, further comprising:
removing the customer secret key, the customer symmetric key, the vendor secret key, and the vendor symmetric key in response to the executing firmware being completed.

16. A method of providing a firmware image, comprising:
generating a vendor symmetric key, and a first key pair including a vendor public key and a vendor secret key;
providing a first key injection command including the vendor secret key and an authenticator to a storage device, controlling the storage device to verify the first key injection command and encrypt and store the vendor secret key with a unique security key;
generating an encrypted firmware image by encrypting the firmware image using the vendor symmetric key, and generating an encrypted vendor symmetric key by encrypting the vendor symmetric key using the vendor public key;
generating a customer symmetric key, and a second key pair including a customer public key and a customer secret key;
providing a second key injection command including the customer secret key and the authenticator to the storage device, controlling the storage device to verify the second key injection command and encrypt and store the customer secret key with the unique security key;
generating a double-encrypted firmware image by encrypting the encrypted firmware image using the customer symmetric key, and generating an encrypted customer symmetric key by encrypting the customer symmetric key using the customer public key; and
providing a firmware set including the double-encrypted firmware image, the encrypted vendor symmetric key and the encrypted customer symmetric key, to the storage device.

17. The method of providing the firmware image of claim 16, further comprising:
periodically replacing the vendor symmetric key and the customer symmetric key.

18. The method of providing the firmware image of claim 16, wherein the generating the vendor symmetric key and the first key pair, and the generating the customer symmetric key and the second key pair is performed in a hardware security module (HSM).

19. The method of providing the firmware image of claim 16, further comprising:
inserting an authentication key corresponding to the authenticator into the firmware image.

20. The method of providing the firmware image of claim 16, further comprising:
injecting an authentication key corresponding to the authenticator into a one-time programmable (OTP) memory of the storage device.

* * * * *